April 8, 1969  A. H. B. WALKER  3,437,909
POWER CONTROL APPARATUS WITH NOVEL SYMMETRICAL
SWITCHING ARRANGEMENT
Filed Oct. 19, 1966

WITNESSES

INVENTOR
Alec H. B. Walker
BY
ATTORNEY

United States Patent Office 3,437,909
Patented Apr. 8, 1969

3,437,909
POWER CONTROL APPARATUS WITH NOVEL SYMMETRICAL SWITCHING ARRANGEMENT
Alec H. B. Walker, Trafford, Pa., assignor to Westinghouse Electric Corporation, Pittsburgh, Pa., a corporation of Pennsylvania
Filed Oct. 19, 1966, Ser. No. 587,871
Int. Cl. H02m 7/46; H03k 17/74
U.S. Cl. 321—47                                                4 Claims

ABSTRACT OF THE DISCLOSURE

Apparatus for supplying power to a load from an A.C. source is disclosed wherein a symmetrical switch is utilized including a pair of switching diodes which are oppositely poled and connected in series between the A.C. source and the load. Each of the diodes has an easy conduction direction for one polarity and a normally blocking direction for the other polarity. The diodes are responsive to be fired in response to firing signals of the opposite polarity. A firing circuit is provided for generating firing signals of opposite polarities which are selectively applied to the diodes for alternately firing each of them to apply A.C. to the load or to fire only one of them to provide D.C. of either polarity to the load.

---

This invention relates to apparatus for reversibly controlling the supply of current from an A.C. (alternating current) source to a load. Reversible control may include periodic reversing at for example the A.C. supply frequency to supply A.C. to a load, and random reversing at arbitrarily selected times to supply D.C. (direct current) to a load. More particularly, the invention relates to such apparatus having a novel symmetrical (bi-lateral) switching arrangement.

In U.S. Patent No. 3,060,345 to E. A. Sack, Jr., there is disclosed a symmetrical switch arrangement wherein a pair of oppositely poled switching diodes in a series A.C. circuit, each having an easy conduction direction and a normally blocking opposite direction, are triggered in the blocking direction by incident radiation which reduces the breakover voltage. The present invention, while employing oppositely poled series connected switching diodes as a symmetrical switch, is a radical departure from the arrangement in the above-mentioned patent in that instead of radiation, electric signals are applied directly to the diodes to fire them in the normally blocking direction. In one example of the invention, firing pulses are applied to each diode at a selected instant during the normally blocking half-cycle of the diode, thus to fire the diode in its normally blocking direction. "To fire" means to be rendered abruptly conductive, that is, abruptly switched from high to low impedance states.

Although other symmetrical switching arrangements are well-known, such as those employing parallel but oppositely poled thyristors (inverse-parallel connection), or a triac, or other devices, generally they are more complex and/or more expensive than arrangements embodying the present invention.

In accordance with one embodiment of the invention, a pair of series connected oppositely poled switching diodes are connected in series with an A.C. source and a load, and a firing pulse generator energized from the A.C. source has a pulse output connected to the junction between the diodes to effect firing of the respective diodes at some instant during their respective normally blocking periods.

It is therefore an object of the present invention to provide control apparatus having a novel symmetrical switching arrangement. Another object is to provide such apparatus which is simple and economical.

Other and further objects and advantages of the invention will become apparent from the following detailed description taken in connection with the accompanying drawings illustrating a preferred embodiment of the invention.

Figure 1:
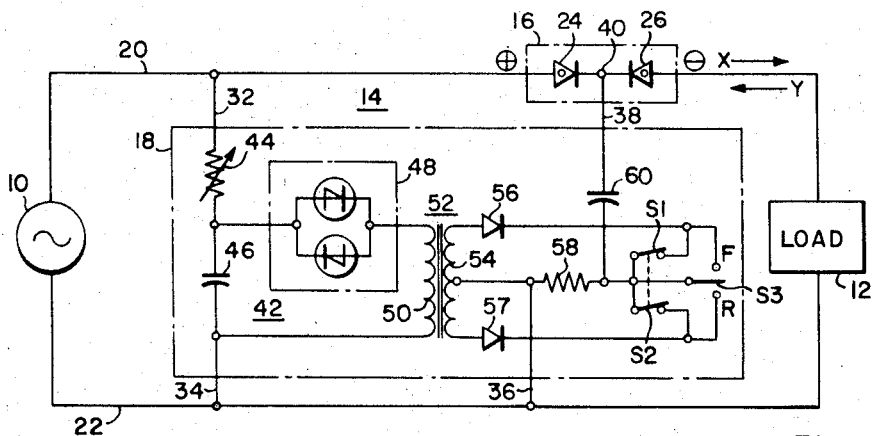
Figure 2:
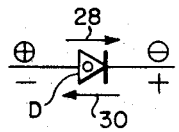
Figure 3:
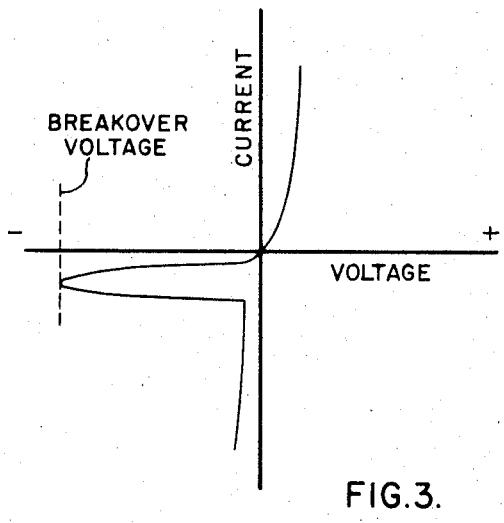
Figure 4:
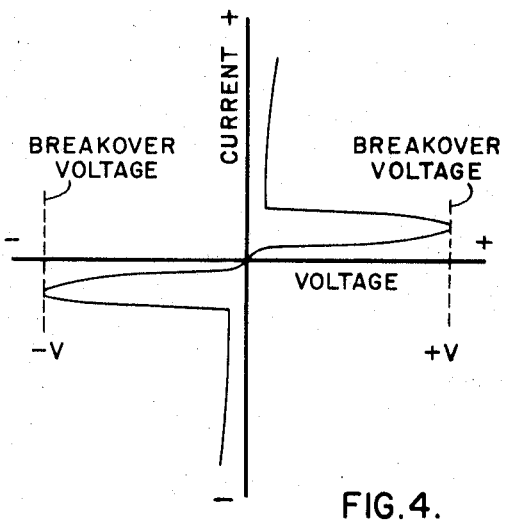

In the drawings:
FIGURE 1 is a schematic diagram of a circuit for reversibly controlling the flow of power from an A.C. source to a load, which circuit embodies the present invention;
FIG. 2 is a detail of FIG. 1 employed to explain the characteristics of both switching diodes;
FIGS. 3 and 4 are graphs illustrating the volt-ampere characteristic of switching diodes employed in the circuit of FIG. 1.

Referring now to FIG. 1, load current from an A.C. source 10 is reversibly supplied to a load 12 through a symmetrical switching arrangement 14 including a symmetrical switch 16 and a firing circuit 18 therefor. The system in FIG. 1 is provided with a pair of power input terminals or lines 20 and 22 connected to the output of the A.C. power supply 10, and through which power is supplied to the load 12. One end of load 12 is connected to line 22 while the upper end of load 12 is connected to line 20 through the switch 16.

The symmetrical switch 16 is comprised of two oppositely poled series-connected switching diodes 24 and 26. Each of the diodes is a breakover device having a low impedance in one direction for voltages of a particular polarity thereacross, and normally a high impedance in the opposite direction for voltages of opposite polarity across the diode below a breakover value. For example, in FIG. 2, where a diode D exemplifies each of diodes 24 and 26, the diode will conduct readily in the direction of the arrow 28 when the polarity of the voltage applied across the diode is as indicated in the circles adjacent to the diode. This easy direction of conduction may be referred to as the "forward" direction, and the complementary voltage having the necessary polarity to drive current through the diode in the forward direction may be referred to as "forward" voltage or as having forward polarity, or even as having forward direction.

On the other hand, the diode D normally blocks current flow in the opposite direction (arrow 30) for voltages of the opposite polarity (uncircled polarity signs, FIG. 2) below the breakover value. In contrast to the "forward" direction, the opposite direction may be conveniently referred to as the "reverse" direction. When the reverse voltage across the diode exceeds the breakover value, the diode fires, i.e., is abruptly rendered conductive in the reverse direction. Conduction in the reverse direction continues until the current falls below the "holding" value.

The above-described characteristics of a breakdown diode are graphically illustrated by the volt-ampere curve in FIG. 3.

While switching or firing of the diode D in the normally blocking direction 30 may be effected by exceeding the breakover voltage across the diode, the diode may also be fired by applying a reverse voltage below the breakover value but having a high rate of rise, for example 50 to 200 volts per microsecond.

The composite volt-ampere characteristic for the series opposed configuration of diodes 24 and 26 is illustrated in FIG. 4, wherein —V and +V are the breakover voltages for the respective opposite directions of switch 16.

U.S. Patent No. 2,953,693 to J. Phillips discloses an example of a breakdown diode suitable for use as diode 24 and as diode 26.

Diodes 24 and 26 may be two physically separate components or they may be mounted on a common support such as a heat sink. They may also be fabricated as an integrated unit having a common electrode corresponding to the junction 40.

The firing circuit 18 supplies voltage components simultaneously to both diodes, which components are in the blocking direction for each diode and are applied at some instant during each half-cycle of the A.C. supply wave. The particular instant (angle) at which these signals are applied to the diodes is selectable by adjusting the phase of the output of the firing circuit 18 relative to the A.C. line voltage. Firing circuit 18 is provided with a pair of power input lines 32 and 34 connected across the A.C. supply lines 20 and 22, and a pair of output lines 36 and 38 connected across (between) line 22 and a junction 40 between the diodes 24 and 26.

In the firing circuit 18, a phase shiftable pulse generating arrangement 42, including a variable resistor 44, a capacitor 46 and a symmetrical breakover device 48, supplies pulses at selectable times during both halves of the supply A.C. cycle to the primary winding 50 of a transformer 52. The secondary 54 of this transformer is connected to a full wave rectifier 56 which supplies full wave rectified pulses across a resistor 58 having one end connected to output line 36 and the opposite end connected to output line 38 through a capacitor 60. The breakover device 48 may for example be an inverse parallel connected pair of Shockley diodes as shown, or a neon lamp, or any other device that normally blocks in both directions until the breakover voltage value is reached across the device. When the voltage of either polarity across the breakover device 48 reaches the breakover value, the device 48 is rendered abruptly conductive (fires) to pass current in a direction in accordance with the applied voltage.

The phase shiftable pulse generating arrangement 42 operates as follows: At the beginning of every half cycle of the supply A.C. the capacitor 46 starts charging through resistor 44, and continues to charge toward the line voltage until the voltage across the capacitor reaches the breakover voltage value of the breakover device 48, whereupon the device 48 fires and discharges the capacitor 46 into the primary winding 50 of transformer 52, thereby inducing a corresponding pulse in the secondary 54 of the transformer. The particular instant during the supply half cycle at which the condenser charge reaches the breakover voltage of the device 48 is dependent on the R.C. time constant of the charging circuit, R being the resistance of resistor 44 and C being the capacitance of capacitor 46. The position in time or phase of the pulses generated by the network 42 relative to the supply A.C. wave may be varied or changed by adjusting the value of resistor 44 to change the R.C. time contsant of the charging circuit. Thus during every half cycle of the supply A.C., there is delivered to the primary 50 a pulse whose phase or position in time relative to the supply A.C. may be selected by adjusting resistor 44. Corresponding pulses are induced in the secondary 50 of transformer 54.

The output winding 54 is connected to a rectifier arrangement including half-wave rectifiers 56 and 57 and switches S1, S2, and S3 for providing across output lines 36 and 38, and thereby to junction 40, unipolar pulses (positive on line 38 in this example), one for every half-cycle of the supply A.C., for controlling an A.C. load, or one on either the positive or negative half cycles of the supply A.C. for controlling a D.C. load, the various choices depending on the positions of switches S1, S2, and S3. The rectified output from secondary winding 54, either half-wave or full-wave depending on the switch position, is connected across the resistor 58 having one end connected through output line 36 to line 22 and the lower end of load 12, the opposite end of resistor 58 being connected through a capacitor 60 and line 38 to the junction 40.

Because of the circuit configuration, each of the pulses supplied through junction 40 by the firing circuit 18 is applied simultaneously to both diodes 24 and 26 in the normally blocking (reverse) direction of each diode.

The voltage applied across the symmetrical switch 16 from the source 10 through lines 22 and load 12 is less than the breakover value of the diodes 24 and 26. The parameters of the components of the firing circuit 18 are selected to provide output pulses on output lines 36 and 38 of sufficient value to fire each diode 24 and 26 during its respective normally blocking periods.

For supplying A.C. to the load 12, the system of FIGURE 1 operates as follows: Switches S1 and S2 must be in the closed position as shown in FIGURE 1 to set up rectifiers 56 and 57 and secondary winding 54 in a center-tapped full wave rectifier configuration, thereby to supply a positive pulse to junction 40 during each half-cycle of the supply A.C. In response to the output signals applied by the firing circuit to the junction 40, on one half cycle one of the diodes in switch 16 will break over and conduct in the normally blocking (reverse) direction, while the other diode will conduct in the easy conducting (forward) direction. For example, when the supply voltage from source 10 is positive on line 20 and negative on line 22 so as to apply across switch 16 a voltage of the polarity indicated by the circled polarity (FIG. 1) symbols, the line voltage with respect to diode 24 will be in the forward direction, and with respect to diode 26 will be in the reverse direction. At a selected instant during this half-cycle depending on the setting of resistor 44, a positive output pulse from the firing circuit 18 will be applied to the junction 40. While this pulse applies a signal component to each diode in its normally blocking direction, because of the polarity of the line voltage, diode 26 will fire and conduct in its breakover direction, while diode 24 will conduct in its forward direction. On the next half cycle at a corresponding instant, firing circuit 18 again applies a positive pulse to the junction 40. However, because of the reversal of the supply voltage during this half cycle, the two diodes of the switch 16 will exchange functions so that diode 24 will breakover and conduct in its normally blocking direction, while diode 26 will conduct in its easy or forward direction.

The conduction duration or angle of the switch 16 during each half cycle is dependent upon the firing angle or instant during the half cycle at which the normally blocking diode breaks over and this is dependent upon the time position or phase of the firing signals supplied by the firing circuit 18 relative to the supply A.C. The conduction duration determines the average voltage applied to the load. Thus the power into the load may be varied by adjusting resistor 44 to change the phase of the firing signals supplied by the firing circuit 18 to the junction 40.

To supply the load 12 with D.C. of one or the other polarity from the A.C. source 10 at selected times as desired, switches S1 and S2 are opened, and switch S3 is set on either position F or position R depending on the direction of current flow desired. For example, it is assumed that with switch S3 in position F, half wave pulses are provided on line 38 during those half cycles of the supply A.C. when the line 20 is positive, and with switch S3 in position R half wave pulses will be provided on line 38 during the half cycles when the line 20 is negative. Since the half wave pulses supplied to the junction 40 by the firing circuit 18 when switch S3 is at position F occur at a selected instant during those supply A.C. half cycles when line 20 is positive, switch 16 will fire only during these half cycles and supply load current in the direction of arrow X. On the other hand, when switch S3 is in the position R, the firing pulses will be supplied along line 38 to junction 40 during the opposite half cycles, that is, when line 20 is negative, and switch 16 will break down only during these half cycles, thus to supply current to the load 12 in the opposite direction (arrow Y).

In any of the control modes described, the amount of power supplied to the load is controlled by selecting the instant during the A.C. supply cycle at which the switch 16 is fired, that is, by controlling the firing angle of switch 16 during the operative half cycles. This is effected in the example shown, by adjusting resistor 44 to control the phase of the output pulses supplied by the firing circuit 18 relative to the supply A.C. wave.

In all forms and operational modes described herein, load current is reversibly supplied to the load. In one mode wherein switches S1 and S2 are closed, current reverses are periodic, and A.C. is supplied to the load; while in the other mode (switches S1 and S2 open, and switch S3 on F or R) the load current reverses are random and arbitrarily chosen by selecting and changing the position of switch S3 as desired to supply reversible D.C. to the load.

Since the firing signal is only required in shunt with the symmetrical switch 16, the firing transformer or circuit does not have to be capable of carrying the load current, and since the diodes 24 and 27 are extremely fast in switching time and can be designed to require low firing energy, low cost firing systems can be devised in which the firing transformer can be miniaturized and energized from a simple pulse generator, for example the circuit described herein. It should be understood that the firing circuit 18 disclosed herein is only an example and other suitable firing circuits for providing control signals at desired times may be employed.

From the disclosure herein, it should be apparent that the present invention provides a simple, effective, and economical, controlled symmetrical or bi-lateral switching scheme.

It is to be understood that the hereindescribed arrangements are simply illustrative of the principles of the invention, and that other embodiments and applications are within the spirit and scope of the invention.

I claim as my invention:
1. Apparatus for supplying power from a source of A.C. to a load, said apparatus comprising:
   first and second power input lines for connection to said source of A.C.,
   a series circuit connected across said lines and including symmetrical switch means connected in series with said load,
   said symmetrical switch means including,
   first and second switching diodes oppositely poled and connected in series,
   each of said diodes having an easy conduction direction for one polarity voltages thereacross and a normally blocking opposite direction for opposite polarity voltages thereacross,
   each of said diodes being capable of being fired in response to the application thereto of a firing signal of said opposite polarity; and
   firing circuit means including,
   means for generating first and second firing signals respectively during the positive and negative half cycles of said source of A.C.,
   selection means for selectively applying said first and second firing signals to said diodes for causing A.C. power to be supplied to said load, or for applying either said first or second firing signals to said diodes so that only one of said diodes is fired in response thereto so that D.C. power of a predetermined polarity is supplied to said load.

2. The combination of claim 1 wherein:
   said firing circuit means has input circuit means connected to said lines whereby the firing circuit means is energized by said A.C. supplied to said lines to generate said first and second firing signals in response thereto.

3. The combination of claim 2 wherein:
   said firing circuit means is adjustable to vary the timing at which said first and second firing signals are generated with respect to said source of A.C.

4. The combination of claim 2 wherein:
   a junction is formed between said diodes, with one of said diodes being connected between the other diode and one end of said load, and
   said firing circuit means includes an output circuit connected across said junction and the other end of said load to apply the selected firing signals to said junction.

References Cited
UNITED STATES PATENTS
3,266,021 8/1966 Druz et al.
3,336,484 8/1967 Ovshinsky _____ 307—256
3,360,713 12/1967 Howell.

LEE T. HIX, *Primary Examiner.*

W. SHOOP, *Assistant Examiner.*

U.S. Cl. X.R.

307—256